United States Patent [19]
Olsen et al.

[11] 3,932,733
[45] Jan. 13, 1976

[54] AUTOMATIC FOCUSING OF AN OPTICAL SYSTEM

[76] Inventors: Bengt Olsen, Flottiljgatan 4, 753 37 Uppsala; Jens Blomster, Vapnargatan 15 A, 753 36 Uppsala; Nils Buss, Vaktargatan 2 B, 754 22 Uppsala; Bjorn Stenkvist, Dobelnsgaten 13, 752 37 Uppsala, all of Sweden; Lucien Preuss, Feldeggstrasse 74, 8008 Zurich, Switzerland

[22] Filed: Mar. 19, 1973

[21] Appl. No.: 342,426

[30] Foreign Application Priority Data
Mar. 17, 1972 Sweden.............................. 3481/72

[52] U.S. Cl............ 235/151; 178/DIG. 29; 178/7.2
[51] Int. Cl.[2]...................... H04N 5/38; G06F 15/46
[58] Field of Search.............. 235/151, 151.1, 151.3; 444/1; 178/DIG. 29, DIG. 1, 7.2, 6.8; 315/31 R, 31 TV; 250/204; 350/46

[56] References Cited
UNITED STATES PATENTS
| | | | |
|---|---|---|---|
| 3,450,833 | 6/1969 | Hobrough | 178/7.2 |
| 3,699,251 | 10/1972 | McKechnie | 178/DIG. 29 |
| 3,721,759 | 3/1973 | Lang | 178/DIG. 1 |
| 3,728,482 | 4/1973 | Wren | 178/DIG. 29 |

OTHER PUBLICATIONS
Kujoory — "Video Display And Focus-Assist Device Of Cydac, A Flying-Spot Scanning Microscope" — Thesis submitted to faculty of Moore School of Electrical Engineering, University Of Pennsylvania, Dec. 1971.

*Primary Examiner*—Joseph F. Ruggiero
*Attorney, Agent, or Firm*—Spencer & Kaye

[57] ABSTRACT

A method of automatically focusing an optical system onto an image includes deriving a measure of the contrast for each of a plurality of images obtained at different settings of the optical and selecting as the final setting that setting which corresponds to the greatest contrast, the measure of contrast being derived from the distribution of selected image elements in a grey scale. Apparatus for carrying out the method uses an image converter to produce the image of the optical system for examination by a grey level measuring device which measures the grey values of a number of image elements.

The distribution of the measured grey values within a grey scale is registered in a memory and this information is used by an electrical calculating system which calculates the value of a contrast function for the particular image being examined. A control device is connected to the calculating system and searches for the maximum value of the contrast function amongst the function values obtained at various settings of the optical system to provide the final setting.

24 Claims, 5 Drawing Figures

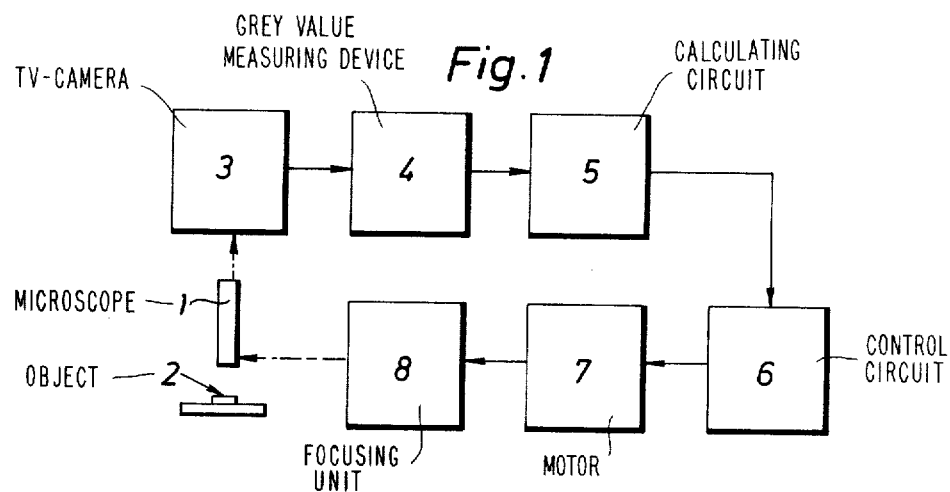
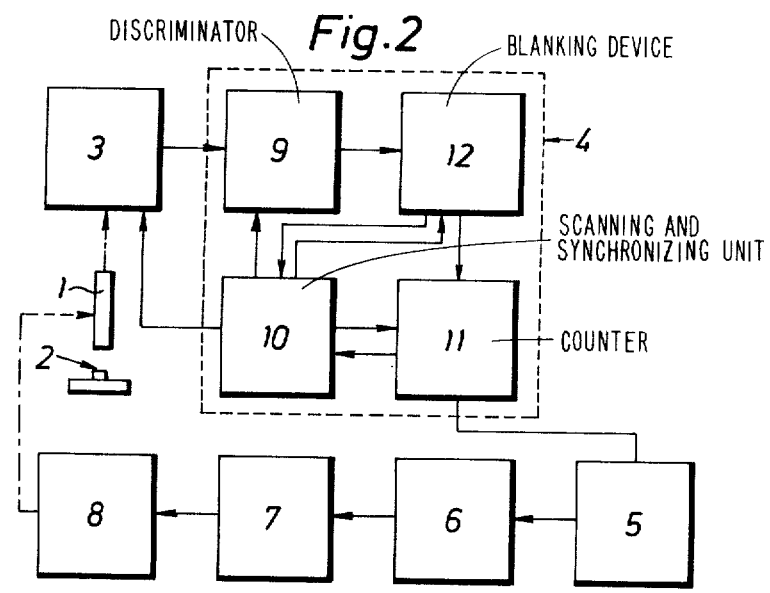

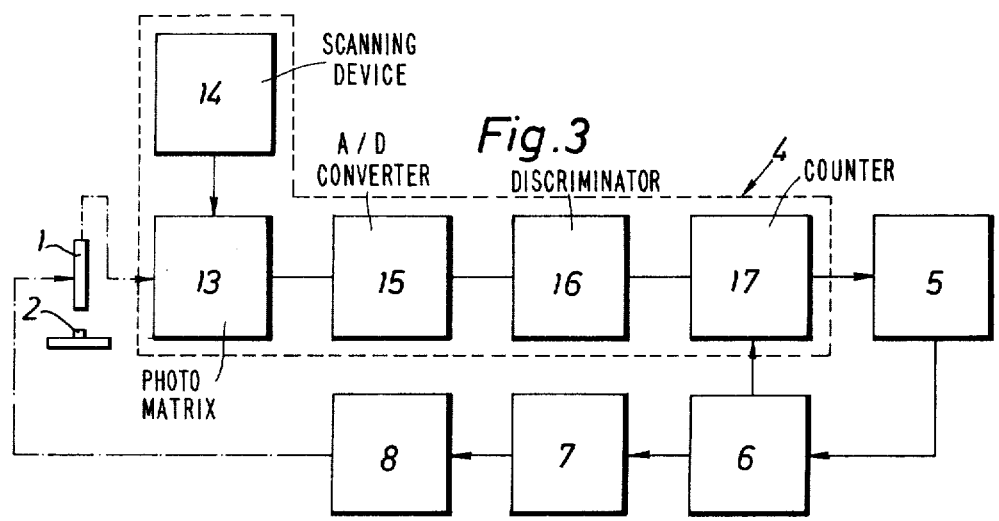
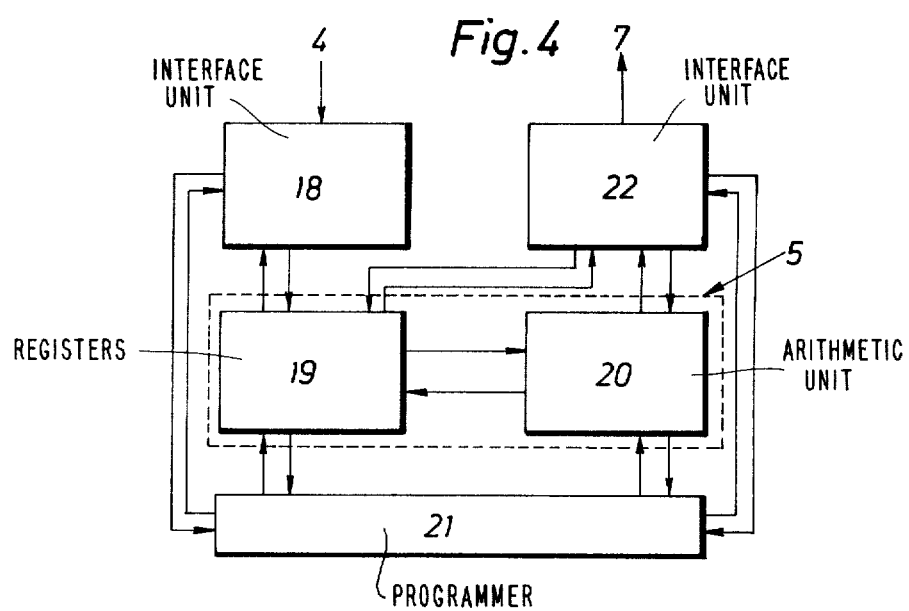

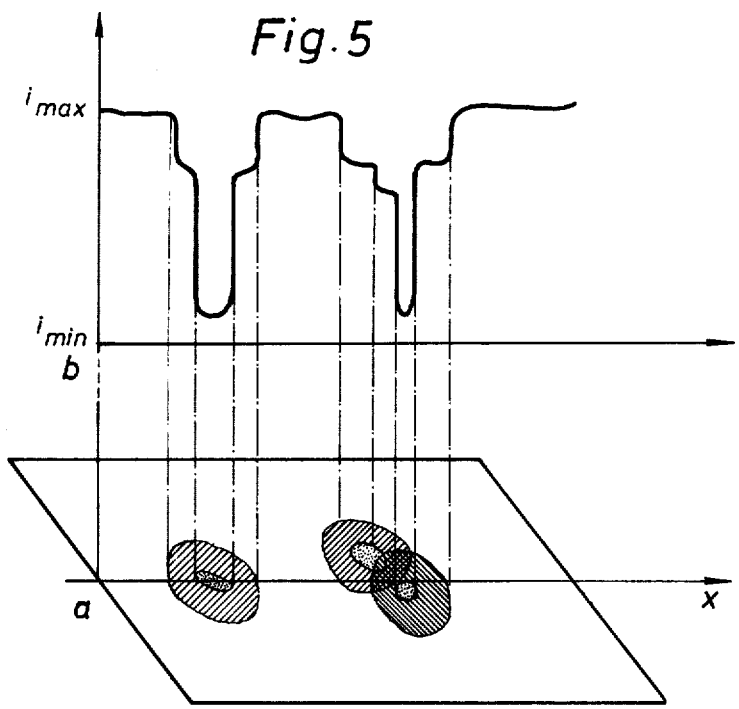
Fig.5
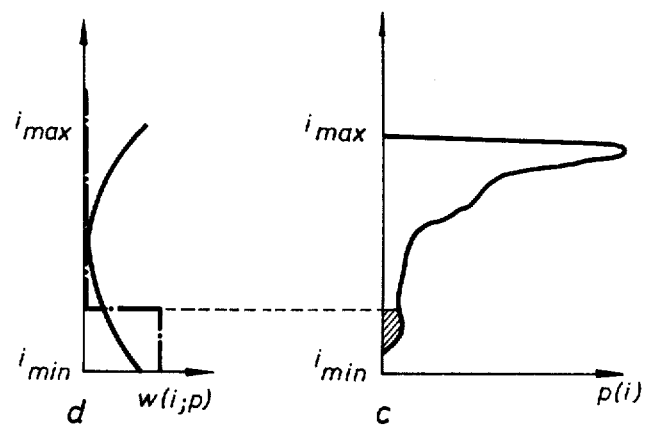

AUTOMATIC FOCUSING OF AN OPTICAL SYSTEM

BACKGROUND OF THE INVENTION

This invention relates to a method of and apparatus for automatically focusing an optical system such as a microscope onto an object.

In mass gynaecological health screening procedures, cell samples are taken and collected for subsequent examination by microscope. This examination which at present is carried out manually is very time consuming, requires many microscopists and is thus very expensive. It would be advantageous, therefore, if the examination of the samples could be carried out automatically, as this would reduce the time and expense involved in examining the collected cell samples and thus make it possible to conduct such mass health screening procedures more frequently. An automatic microscopy of the samples requires inter alia a method of automatically focusing the microscope. The present invention offers a solution to this particular problem and also offers a general solution to the problem of focusing an optical system onto an object.

Devices for automatically focusing optical systems have been proposed previously. In these known devices the distance between the object and the lenses of the optical system is measured and thereafter the setting of the system is corrected on the basis of the measured distance. For this purpose, a plurality of sophisticated measuring methods based on, for example, optical interference, or laser distance measurements have been used. All of these methods suffer from the disadvantage that the distance is in fact measured from the surface of a slide, i.e. glass plate, covering the object, and not from the object itself. The present invention, however, performs focusing onto the object itself and, thanks to this, correct focus will be set even if the thickness of the slides vary from sample to sample. If previously known methods are used this varying thickness may often lead to an unfocussed image although the distance setting is correct.

SUMMARY OF THE INVENTION

It is therefore an object of the invention to provide an improved method and apparatus for automatically focusing an optical system, for example a microscope, onto an object.

The present invention is based on the fact that the information content of an image of an object is a maximum when the optical system is in focus. In information theory contrast, colours etc., may be regarded as information.

According to the invention, a method of automatically focusing an optical system onto an object includes deriving a measure of the contrast for each of a plurality of images obtained at different settings of the optical system, and selecting a final setting corresponding to a focussed image as the setting corresponding to the image of greatest contrast, said measure of contrast being derived from the distribution of selected image elements in a grey scale.

Apparatus according to the invention comprises an image converter connected to the optical system to reproduce the optical system's image of the object, a grey value measuring device connected to the picture converter for measuring the grey value of a number of image elements appearing in the image converter's image and for arranging the grey values of said image elements in a grey scale, a memory connected to said grey value measuring device to store and count the distribution of said image elements in said grey scale at a particular setting of the optical system, an electrical circuit connected to said memory for calculating a function belonging to the following class of functions $$F = \sum_{i=1}^{i=n} w(i) P_i$$

where
- $i$ is the grey value in a grey scale
- $n$ is the number of levels of the grey scale
- $P_i$ is the number of picture elements having grey value $i$
- $w(i)$ is an always positive or always negative weight function the absolute value of which has the property of being larger in or in the vicinity of the extreme value of the grey scale and smaller at its mean value and generating a signal representing the value of said function at said distribution, a control device being connected to said electrical circuit for searching for the extreme value of said function on the basis of the information given by those values which said function will attain for mutual different settings of the optical system, and a device for changing the setting of said optical system in such a direction that said extreme value of said function is reached.

The present automatic focusing method and apparatus may be used with optical systems which operate with electromagnetic radiation in parts of the spectrum other than the visible, for example, in the infrared region. The method may also be used in connection with electron microscopes, such as scanning electron microscopes and transmission electron microscopes.

In the case of a so-called transmission electron microscope it may happen that the contrast does not have its maximum value when the microscope is in focus. However, this problem may be obviated by selecting a final setting of the optical system which is displaced relative to the setting corresponding to maximum contrast in the image.

BRIEF DESCRIPTION OF THE DRAWINGS

Other objects and advantages of the present invention will be apparent from the following description of preferred embodiments given with reference to the appended drawings, in which:

FIG. 1 is a block diagram of apparatus embodying the present invention for automatically focusing an optical system;

FIG. 2 is a block diagram of an embodiment of the apparatus of FIG. 1 composed in part of a known grey value measuring device;

FIG. 3 is a block diagram of another apparatus embodying the invention incorporating a different form of grey value measuring device;

FIG. 4 is a block diagram of a device for calculating the contrast function and a device for establishing the maximum value of the contrast function with the aid of a computer and on the basis of the different values said function will attain for different out-of-focus-settings of the optical system; and FIG. 5 shows graphs of various signals obtained during linear scanning of a cell sample.

DESCRIPTION OF PREFERRED EMBODIMENTS

In FIG. 1 there is shown a microscope 1 to be focussed on an object 2. The microscope image is transmitted to an image converter, in this case a TV-camera 3, which is used to determine the grey value of individual image elements of the microscope image. The video signal from the TV-camera is applied to a grey value measuring device 4 measuring the grey values of the separate image elements. In this particular case the grey value measuring device is adapted to measure 16 different grey levels which together will form a grey scale ranging from completely white to completely black. The video signal beaming information regarding the grey value of the image elements is a continuous, analog signal which means that the grey value measuring device will assign a predetermined grey level to the actual grey value of an image element. The grey value measuring device can in this respect to regarded as an analogue digital converter. Each grey level is associated with a register in which the number of image elements having or being assigned to this grey level are counted. It should be noted that the number of registers and thus also the number of grey levels of the grey scale may be increased or decreased. The expression "image element" means a carefully measured fraction of a portion of the video signal corresponding to a predetermined scan line and the grey value of this image element is the major value as measured during this carefully measured fraction. In an embodiment of the invention the number of lines of the TV-system is 625. Each line comprises 512 image elements which means that each image of the object will be resolved into 3,200,000 image elements all of which will be counted and classified with regard to grey level. Depending on the field of use of the microscope this information may be required, for example in connection with analysis of biogical cells. However, this amount of information is more than sufficient for the purpose of automatic focussing. In the block diagram shown in FIG. 2 there is shown a previously known grey value measuring device 4 by way of which it is possible to reduce the number of examined image elements. The video signal is timed by way of clock pulses from a clock pulse generator included in a scanning and synchronizing unit 10. In this particular embodiment line-wise scanning is used. During the scanning of the first 31 lines of the video signal no image elements are examined. During the scanning of line 32 a time slot of the video signal will be examined by a discriminator 9. The time slot has a predetermined "width", for example the width of one clock pulse, and is also located a predetermined distance from the edge of the image. During this time interval discriminator 9 will measure the grey level to which the image element belongs and this picture element will simultaneously be counted by the register associated with its measured grey level. As previously stated the number of grey levels is 16, ranging from completely white to completely black, and the number of registers is thus also 16, these 16 registers together forming a counter 11. During the next following thirtyone time slots the video signal is examined in the same way and by the end of scan line 32 64 image elements have been counted and assigned to registers in counter 11. This cycle is repeated for the following 63 scan lines 33 to 95 and the examination of the video signal is terminated at the beginning of line 96. After the scanning operation, image information relating to a square pattern of 64 × 64 ( = 4096) image elements are present in counter 11. A device 12 serves to blank a predetermined adjustable part of the image, thereby making it possible to vary both the number of image elements examined in a line and the number of examined lines of the TV-image. It is thus possible to examine any part of the microscope image of the object.

In FIG. 3 a second embodiment of grey value measuring device is used. The microscope image or a part thereof is in this case directly converted into grey values relating to separate image elements thereof. To this end a so-called photo matrix 13 is used. This matrix is, for example, divided into 64 × 64 squares each of which comprises a photo sensitive device or photo diode generating a voltage proportional to the grey value of the image element thereon. A scanning device 14 scans the matrix in accordance with a predetermined pattern. The resulting output voltage from each photo sensitive device of the matrix is digitalised by an analog/digital converter 15 and the grey value of the scanned square as represented by the digital output is classified by a discriminator 16. The classification will be conducted with regard to grey levels in a grey scale ranging from completely white to completely black. Finally each scanned image element is recorded by a register associated with the grey level assigned to the image element. The number of registers corresponds to the number of grey levels in the grey scale and the registers together form a counter 17. Units 13–17 together form a grey value measuring device 4. Clearly the analog/digital converter 15 may be omitted if the counter 17 is of the analog type, for example of the kind comprising a number of capacitors. In this case the number of capacitors equals the number of grey levels used in the grey scale. For each image element belonging to a particular grey level, a unit charge is placed on the capacitor corresponding to the grey level concerned.

On the basis of the information existing in the grey value measuring device 4 after scanning of an image or part thereof it is possible to decide whether the microscope is in focus or not. If the microscope is not in focus the output of the image converter represents a blurred picture consequently a large number of image elements are distributed over a few grey levels around the mean value of the grey scale. If on the other hand the picture is in focus the distribution of the image elements around the mean value of the grey scale will increase since in this case the image will have completely white and completely black portions. Thus by examination of the distribution of the image elements for different settings of the microscope it is possible to ascertain whether the microscope is in focus or not. In other words the limits of an interval of the grey scale within which a predetermined number of selected image elements fall are at a maximum distance from each other for a focussed image.

As a measure of the distribution of the image elements in the grey scale the following function may be used:

$$F = \sum_{i=1}^{i=n} w(i) P_i \quad (1)$$

where $i$ is the grey value, $n$ is the number of grey levels in the grey scale, $P_i$ is the number of image elements of the picture having the grey value of $i$, and $w(i)$ is a permanently positive or permanently negative weight function, the modulus of which is larger at or in the vicinity of the extreme levels of the grey scale and smaller about the mean grey value of the scale.

As $w(i)$ it is possible to use the function $(i-M)^2$ or $2^{|i-M|}$ where $$M = \frac{\sum_{i=1}^{n} P_i \cdot i}{\sum_{i=1}^{n} P_i} \qquad (2)$$

This function is referred to as a contrast or sharpness function and is thus a measure of the contrast of the image for different settings of the optical system. The value of this function for a particular setting of the microscope is calculated by an electrical circuit 5 which is connected to the grey value measuring device 4. (Compare FIGS. 1 and 2).

In a preferred embodiment of the invention this electrical circuit is designed to calculate the following function:

$$F = \sum_{i=1}^{n} (i-M)^2 P_i$$

where M is defined in accordance with equation 2 above.

By examining the function values for different settings of the optical system it is possible to search for a setting corresponding to a focussed system, i.e. a setting corresponding to the largest value of the function. This search for the largest function value is carried out by an electrical control circuit 6 working in accordance with any suitable known algorithm for locating the maximum value of a function. The search for the maximum value may for example be based upon an optimizing procedure according to which the function values are calculated for different settings of the optical system. To this end the electrical control circuit is connected to a servo- or step motor 7 controlling a focussing unit 8 of the microscope in accordance with adjustments ordered by the algorithm. The search for the maximum value of the contrast function by way of an algorithm can be carried out using known techniques and will therefore not be described in detail. A numerical analyst knows that there are some 15 different methods of searching for an extreme value of a function.

The electrical control circuit 6 may also be in the form of a programmer designed to carry out the algorithm and comprising a memory. A micro programmed counting unit or an analog, digital or hybrid computer programmed in accordance with the algorithm may be used.

When the electrical control circuit, the programmer or the computer has established the largest value of the function a signal corresponding to this value is delivered to the servo- or step motor 7 which then will carry out the ultimate setting of the microscope.

The device shown in FIG. 1 or FIG. 2 operates in the following manner;

When the microscopist has prepared a sample, for example a cancer cell sample, and this has been inserted in the microscope he presses a button delivering an activating signal to the electrical circuit 5 to clear the calculation of the contrast function corresponding to the present setting of the microscope. The electrical circuit 5 waits for 20 milliseconds until the complete TV-picture has been scanned and thereafter it calculates the contrast function on the basis of the information contained in the grey value measuring device 4. After the calculation of the function value in the electrical circuit 5, control passes to the electrical control circuit 6 which then after a repeated search procedure with the aid of the step motor and repeated calculations of the contrast function will find the ultimate setting corresponding to a focussed picture. Thereafter no further settings are made and all units of the device are reset before the next sample is inserted into the microscope.

The electrical circuit 5 described in connection with FIGS. 1 and 2 may also be set up to calculate the following function:

$$F = \left| \int b_1(x) e^{i\omega x} dx \right| + \left| \int b_2(x) e^{i\omega x} dx \right| + \ldots + \left| \int b_m(x) e^{i\omega x} dx \right| \qquad (3)$$

where $b_k(x)$ is grey value at a coordinate $x$ along a line across the image, said line being selected in accordance with a predetermined rule, $k$ is the number of a line selected in accordance with said rule, $m$ is the number of lines to be examined, and $\omega$ is a number having the property that $1/107$ generally has the same order as the resolution of the image.

In this particular case, the electrical circuit calculates the high frequency function $e^{i\omega x}$ which is superimposed on the slowly varying video signal function $b_k(x)$. By adding these functions over a number of adjacent lines, for example ten lines, a measure of the jump of the light intensity between adjacent image elements is achieved. If these jumps are big, i.e. the curve of function F comprises sharp edges, the system is in focus. However, if said curve has smoothly rounded edges the system is not in focus. The output signal from circuit 5 may be regarded as a measure of the magnitude of the so called Fourier coefficient for the selected value of $\omega$. The electrical control circuit 6 in this case operates in accordance with an algorithm by which it is possible to establish when this coefficient has its maximum value. The number $\omega$ is selected with regard to the resolution of the image and with regard to the background noise in such a way that the effect of the noise is minimised. It should also be noted that the lines along which the grey values are measured may pass across the picture along the same or along different directions. The integration limits of the integrals of equation (3) are the coordinates for the length along which the picture is scanned.

Instead of the above mentioned Fourier functions Hadamard or Walsh functions may be used to form the contrast function. Methods using two-dimensional functions may of course also be used.

A second embodiment of the present invention wherein a computer is used will now be described in more detail with reference to FIGS. 2 and 4. As indicated in FIG. 4, an interface 18 provides the necessary connections between each register of the grey value measuring device and the electrical circuit 5. In this embodiment, the electrical circuit 5 comprises a number of registers 19 connected to an aritmetic unit 20 in which the contrast function is calculated. The different values of the contrast function corresponding to the different settings of the optical system are stored in any of the registers 19. An algorithm involving a suitable programmer 21 compares the stored function values corresponding to at least two previous settings of the optical system with the presently calculated function valve. The electrical control circuit 5 thus operates in dependence on a program and will generate an output signal to an interface 22 to the servo- or step motor 7. This output signal indicates the adjustment to be made, for example the magnitude and direction of the setting to be performed; or alternatively it indicates that the optical system is in focus, that is maximum sharpness has been achieved.

The expression "grey scale" as used in this specification refers to a set of grey levels, wherein the ratio between the grey values of adjacent grey levels may vary over the scale. Thus it is possible that, for some applications, a grey scale having 16 levels may be required to have thirteen levels reserved for grey levels ranging from dark grey to black and only three grey levels reserved for the rest of the grey levels from completely white to dark grey.

It is of course possible to use only a selected interval of the grey scale for focussing purposes. In this case only such image elements which are associated with this interval are examined.

In the embodiments described above, the grey value of an image element is assigned to a suitable grey level in a grey scale having discrete levels where an analog signal, for example a video signal, is processed without being digitalised as in the above described embodiment, the contrast function may be written as $$\int_{i=i_{min}}^{i=i_{max}} w(i)p(i)di$$

where
($i_{min}$; $i_{max}$) are the grey levels defining the limits of a continuous range of grey values which the image elements may assume,
$i$ is a grey value in the range of grey values,
$p(i)$ is the frequency distribution of selected image elements having the grey value $i$
$w(i)$ has the same definition as before.

Examples of the use of the embodiments of apparatus described hereinbefore will now be given:

EXAMPLE 1

A microscope was focussed on an object comprising a small number of features. The microscope image had a very clear and unambiguous maximum sharpness for the observer. The image converter, a TV-camera having a Plumbicon tube, had a grey scale comprising 16 different grey levels. A part of the image was examined, more particularly 512 × 625 image elements were used and each image element was analysed with regard to its grey value. The grey values were used to calculate the following contrast function:

$$F = \sum_{i=1}^{i=16} (i-M)^2 P_i$$

where $$M = \frac{\sum_{i=1}^{i=16} P_i i}{\sum_{i=1}^{i=16} P_i}$$

The following table shows that the contrast function reaches a maximum value when the image is in focus. The sharpness settings are indicated in hundredths of a revolution of the focussing knob of the microscope. The smallest rotation which makes it possible to notice a sharpness variation with the naked eye is about 2 - 3 hundredths of a revolution. The observer's (subjective) conception of "best" sharpness is indicated by the setting 0. In this calculation $$\sum_{i=1}^{n} P_i$$

has been normalised to 1 which, of course, does not influence the position of the maximum of the function.

| Setting | Function value |
|---------|----------------|
| −10     | 0.319          |
| − 5     | 0.421          |
| − 3     | 0.491          |
| 0       | 0.533          |
| + 3     | 0.527          |
| + 5     | 0.465          |
| +10     | 0.348          |
| +40     | 0.155          |
| +45     | 0.139          |
| +50     | 0.124          |

Result: The maximum sharpness at setting 0 is very distinct. Settings 40, 45 and 50 show that it is possible to determine in which direction the contrast function increases even if it is far from focus and the adjustment knob is rotated a small angle.

EXAMPLE 2

The same unit as in example 1 was used. The object, however, comprised more features of a higher density. To the observer a focussed image was less distinct since the extension of the features in the depth direction was comparatively great. The observer's conception of "best" sharpness ranged over a wider range of the microscope scale depending on the position of the focussing plane along the object. Setting 0 indicates the observer's opinion of best sharpness "on the average".

| Setting | Function value |
|---------|----------------|
| −10     | 1.699          |
| − 5     | 1.815          |
| 0       | 2.013          |
| + 5     | 2.011          |
| +10     | 1.895          |
| +20     | 1.679          |
| +40     | 1.347          |
| +80     | 0.791          |
| +160    | 0.422          |

Result: Since the image comprises features of higher density the function values are much greater than in example 1. Maximum sharpness is less distinct and an automatic mode of the system would set the microscope knob somewhere between 0 and +5. This is entirely satisfactory. In this case it would be possible to calculate the contrast function over a small part of the image which will result in such a setting of the system that those features which lie within this part of the picture will be in focus.

EXAMPLE 3

The weight function of $w(i)$ in equation (1) is so selected that $w(k) = 1$ for that grey value $k$ of the grey scale which is the largest grey value appearing in the picture and $w(i) = 0$ for the rest of the grey values $i \neq k$. This implies that $w(i) = w(i; P_1; P_2 \ldots P_n)$. Thus the contrast function F equals the number of image elements having the darkest grey level appearing in the image. The focussing knob of the microscope was rotated manually on the basis of the function values for different microscope settings. At first the darkest grey level appearing in the image was established. Then the focussing knob was rotated in the direction for which the number of picture elements in this grey level increased. In doing so it happened that an image element belonging to a still darker grey level turned up. The observer then began to place as many image elements as possible in this dark grey level. The adjustment knob was consistently rotated in the direction for which this number increased. The setting corresponding to a maximum number of image elements in the darkest grey level did actually correspond to a focussed condition which could be verified by observation of the microscope image. The setting was entirely satisfactory and could not be improved by subsequent adjustment. Result: This very simplified function is much more dependent on the quality of the image than the function used in Examples 1 and 2. For certain types of objects, for example small white spots on a black background, it would probably lead to a faulty result. However, it is possible to define a measure of the contrast using a number of individual elements in or in the immediately vicinity of at least one extreme value of the grey scale.

FIG. 5 illustrates the above described modes of operation using a TV-system. Three cells are shown lying on a slide. The electron beam of the TV system is shown as scanning along the X-axis (5a) and the corresponding video signal is indicated above (5b). At the bottom right of the drawing, the distribution $p(i)$ of the grey values appearing along line X is shown (5c). At the bottom left two examples of the weight function $w$ $(i,p)$, are shown (5d), namely those used in Example 1 (full line) and Example 3 (dashed-dotted) respectively.

For certain optical systems it may be the case that a certain degree of unsharpness is required in order to achieve maximum image quality. In such a case it is possible to focus the optical system in accordance with the focussing method of the present invention and thereafter defocus the system to the required degree.

What I claim is:

1. A method of automatically focussing an optical system onto an object, comprising:
   deriving a measure of the contrast for each of a plurality of images obtained at different settings of the optical system; and
   determining the final focussed setting of the optical system as that setting which corresponds to the image of greatest contrast;
   wherein the improvement comprises:
   deriving the measure of contrast from the distribution of selected elements of the image within a grey scale.

2. The method as claimed in claim 1, wherein the measure of contrast is taken as the number of selected image elements having grey values which lie in the vicinity of at least one extreme value of the grey scale.

3. The method as claimed in claim 1, wherein the measure of contrast is taken as the distance between the limiting values of an interval of the grey scale within which a predetermined fraction of the selected image elements lie, and the final setting of the optical system is determined as that setting which corresponds to the maximum value of the said distance.

4. The method as claimed in claim 1, wherein the measure of contrast is taken as a function belonging to the following class of functions.

$$F = \sum_{i=1}^{i=n} w(i)P_i$$

where
$i$ is a grey value in a grey scale,
$n$ is the number of levels of the grey scale
$P_i$ is the number of image elements having the grey value of $i$,
$w(i)$ is a weight function which is permanently of the same sign and the modulus of which is larger in the vicinity of the extreme values of the grey scale and smaller around the mean value of the scale,
and the final setting of the optical system is determined as that setting which corresponds to an extreme value of said function.

5. The method as claimed in claim 4, wherein the weight function varies through the grey scale and is defined as
$$w(i) = w(i, p_1, p_2 \ldots p_n)$$

6. The method as claimed in claim 4, where the weight function has a first constant value (e.g. equal to 1) for image elements belonging to an extreme interval of the grey scale that comprises at least a predetermined number of image elements for a particular setting of the optical scale and a second constant value (e.g. equal to 0) for the rest of the grey scale.

7. The method as claimed in claim 1, wherein the measure of contrast is taken as a function belonging to the following class of functions:

$$\int_{i_{min}}^{i_{max}} w(i)P(i)di$$

where the grey value of an image element may assume continuous grey values from $i_{min}$ to $i_{max}$, the interval $(i_{min}, i_{max})$ representing the grey scale,
$i$ is a grey value in said grey scale,
$p(i)$ is the frequency distribution of the selected image elements having the grey value of $i$, and
$w(i)$ is a weight function which is permanently of the same sign and the modulus of which is larger in the vicinity of the extreme values of the grey scale and smaller around the mean value of the scale, and the final setting of the optical system is determined as that setting which corresponds to an extreme value of said function.

8. The method as claimed in claim 7, wherein the weight function varies through the grey scale and is defined as $$w(i) = w(\, p_1, P_2 \ldots P_n)$$

9. A method of automatically focussing an optical system onto an object, comprising:
deriving a measure of the contrast for each of a plurality of images obtained at different settings of the optical system; and
determining the final focussed setting of the optical system as that setting which corresponds to the image of greatest contrast;
wherein the improvement comprises:
using as the measure of constrast a function representing the distribution of selected elements of the image within a grey scale, such function being of the form:

$$F = \sum_{i=1}^{i=n} (i-M)^2 P_i \, ,$$

where $$M = \frac{\sum_{i=1}^{i=n} P_i \, i}{\sum_{i=1}^{i=n} P_i}$$

where
$i$ is a grey value in the grey scale,
$n$ is the number of levels of the grey scale,
$P_i$ is the number of image elements having the grey value of $i$.

10. The method as claimed in claim 8, wherein the number of levels of the grey scale is preselected.

11. The method as claimed in claim 1, wherein the setting of the optical system is made with the aid of a known algorithm suitable for the calculation of the extreme value of a function of the distribution of the image elements in the grey scale, using an optimizing method based upon the different contrast values for the different settings of the system.

12. The method as claimed in claim 11, wherein the measured value corresponding to a setting of the optical system is fed to an input of an electrical circuit being constructed to perform the selected function.

13. The method as claimed in claim 12, wherein the output signals of said electrical circuit is fed to an electrical control circuit constructed to perform the algorithm for selecting the setting of the optical system corresponding to the extreme value of the function.

14. The method as claimed in claim 12, wherein the output signals of the said electrical circuit are fed to a program circuit constructed to execute said algorithm and provided with a memory for performing the setting of the system corresponding to the extreme value of the said function.

15. The method as claimed in claim 12, wherein the output signals of the said electrical circuit are fed to a computer programmed in accordance with said algorithm in order to perform the setting of the system corresponding to the extreme value for each function.

16. The method as claimed in claim 12, wherein the output signals of the said electrical circuit are, after further processing, fed to a step- or servo motor controlling the focussing unit of the optical system.

17. An apparatus for focussing an optical system, wherein the improvement comprises:
an image converter arranged to reproduce an image formed by the optical system in any setting thereof;
a grey value measuring device operatively connected to the image converter to measure the grey value of a plurality of image elements of the image reproduced by the image converter and to arrange the grey values in a grey scale;
a memory operatively connected to the grey value measuring device for recording the distribution of the image elements in the grey scale;
an electrical system connected to the memory and operative to calculate a function belonging to the following class of functions:

$$F = \sum_{i=1}^{i=n} w(i) P_i$$

where
$i$ is a grey value in a grey scale,
$n$ is the number of levels of the grey scale,
$p_i$ is the number of image elements having the grey value of $i$,
$w(i)$ is a weight function which is of constant sign and the modulus of which is larger in the vicinity of the extreme value of the grey scale and smaller around the mean value of the scale,
to deliver a signal representing the value of the said function at the said distribution;
a control device operatively connected to said electrical circuit for searching for the extreme value of said function of the basis of the information given by the values said function will attain for different settings of the optical system;
and a device for changing the setting of said optical system in such direction that said extreme value of said function is reached.

18. The device as claimed in claim 17, wherein said electrical circuit is arranged to calculate the following function:

$$\int_{i=i_{min}}^{i=i_{max}} w(i) p(i) di$$

where the grey value of an image element may assume continuous grey values from $i_{min}$ to $i_{max}$, the interval $(i_{min}, i_{max})$ representing the grey scale, and
$p(i)$ is the frequency distribution of the selected image elements having the grey value of $i$.

19. The device as claimed in claim 17 wherein said control device is arranged to search for the extreme value of said function by way of an optimizing method based upon the different values of the function for different settings of the optical system with the aid of an algorithm.

20. The device as claimed in claim 19, wherein the control device is an electrical circuit arranged to execute said algorithm.

21. The device as claimed in claim 19, wherein said control device is a program device provided with a memory and being adapted to execute said algorithm.

13

22. The device as claimed in claim 19, wherein said control device is a computer programmed in accordance with said algorithm.

23. The device as claimed in claim 17, wherein said

14 image converter comprises a TV-camera.

24. The device as claimed in claim 17, wherein said picture converter is a matrix of photodiodes.

* * * * *